US009344341B1

(12) United States Patent
Kharitonov

(10) Patent No.: US 9,344,341 B1
(45) Date of Patent: *May 17, 2016

(54) INTEGRATED PACKET INSPECTION AND MODIFICATION SYSTEM AND NETWORK DEVICE FOR INTERNET SERVICE PROVIDER MARKET RESEARCH AND INFLUENCE

(75) Inventor: Daniel Kharitonov, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 622 days.

This patent is subject to a terminal disclaimer.

(21) Appl. No.: 13/601,018

(22) Filed: Aug. 31, 2012

Related U.S. Application Data

(63) Continuation of application No. 12/234,320, filed on Sep. 19, 2008, now Pat. No. 8,259,722.

(60) Provisional application No. 61/054,411, filed on May 19, 2008.

(51) Int. Cl.
H04L 12/28 (2006.01)
H04L 12/26 (2006.01)

(52) U.S. Cl.
CPC .................................. H04L 43/028 (2013.01)

(58) Field of Classification Search
None
See application file for complete search history.

(56) References Cited

U.S. PATENT DOCUMENTS

| | | |
|---|---|---|
| 6,598,034 B1 | 7/2003 | Kloth |
| 6,681,232 B1 | 1/2004 | Sistanizadeh et al. |
| 7,593,928 B2 | 9/2009 | Canon et al. |
| 7,660,737 B1 | 2/2010 | Lim et al. |
| 7,840,911 B2 | 11/2010 | Milener et al. |
| 7,930,206 B2 | 4/2011 | Koningstein |
| 7,949,563 B2 | 5/2011 | Collins |
| 8,259,722 B1* | 9/2012 | Kharitonov ................... 370/392 |
| 2008/0059285 A1 | 3/2008 | Hamoui |
| 2009/0055267 A1 | 2/2009 | Roker |
| 2009/0106234 A1 | 4/2009 | Siedlecki et al. |
| 2009/0157484 A1 | 6/2009 | Konowe |
| 2009/0259533 A1 | 10/2009 | Utter et al. |
| 2010/0036720 A1 | 2/2010 | Jain et al. |

* cited by examiner

Primary Examiner — Willie J Daniel, Jr.
(74) Attorney, Agent, or Firm — Shumaker & Sieffert, P.A.

(57) ABSTRACT

A network router includes interfaces to receive packets, a routing engine that executes a routing protocol to maintain routing information specifying routes through a network, a packet forwarding engine forward the packets to the interfaces in accordance with the routing information, one or more advertising engine service cards comprising a packet inspection engine and an advertising engine control unit, and a set of dynamic filters that identify packets for inspection by the packet inspection engine based on characteristics of the packet. The filters direct any matching ones of the packets from the packet forwarding engine to the packet inspection engine within the advertising engine service card, and the packet inspection engine analyzes the packets to extract information from the packets based on configured advertising engine policies. The advertising engine control unit outputs commands to dynamically add and delete filters from the set of dynamic filters.

26 Claims, 9 Drawing Sheets

INTEGRATED PACKET INSPECTION AND MODIFICATION SYSTEM AND NETWORK DEVICE FOR INTERNET SERVICE PROVIDER MARKET RESEARCH AND INFLUENCE

This application is a continuation of U.S. application Ser. No. 12/234,320, filed Sep. 19, 2008, which claims the benefit of U.S. Provisional Application No. 61/054,411, filed May 19, 2008, the entire content of which is incorporated herein by reference.

TECHNICAL FIELD

The invention relates to computer networks and, more particularly, to packet processing within computer networks.

SUMMARY

In general, techniques are described for in-line packet inspection and optional modification within a high-end general-purpose packet processing network device of a packet-based computer network, such as the Internet. Example network devices include a high-end router or a switch within a network access service provider that provides connectivity to the Internet. The device may be useful for market research and influence. For example, techniques are described to efficiently implement and integrate an embedded packet search and modification system for market research and influence, such as an in-line advertising engine ("ad engine"), within the network device. As a result, a specialized, self-contained appliance executing an ad engine for dynamic advertisement insertion may be avoided.

In one aspect consistent with the principles of the invention, the general-purpose packet processing network device processes transit traffic flowing at very high speeds (such as up to line rate speeds) with normal routing and switching functions applied. For example, the network device may be a router or a switch that operates as part of an Internet Service Provider (ISP) network. The network device includes a high-speed packet forwarding engine having one or more dynamic lossless packet filters that can be applied at line-rate speeds to identify and possibly redirect traffic of interest for packet inspection and possibly for packet modification by an integrated in-line ad engine. The dynamic filters may be created and installed within the forwarding plane of the router or switch on-the-fly to identify the traffic of interest. The network device may create, apply, or remove the dynamic filters by way of a software control module without affecting that transit traffic which is not of interest according to the dynamic filters.

The dynamic filters can be applied in the forwarding plane of the network device to individual interfaces or forwarding information base (FIB) entries, and can be based on variety of dynamically defined criteria associated with incoming packets. The criteria may include, for example, source and destination addresses, ports, and any other packet header information that can be processed at high speeds (i.e., line-rate). The operation of the filters diverts those packets of interest for further analysis without affecting the rest of the traffic; therefore, it is possible that only a small portion of overall transit packets are actually passing through the in-line ad engine at any given point of time. However, given the dynamic nature of the filter, it can, if needed, cover the entire of transit traffic array in the time domain, one section at a time. For example, the dynamic filters may be applied to identify packets associated with specific groups of users over time, specific server destinations over time, specific applications, and other classes of traffic that are identified as the most likely to yield useful data. Thus, the dynamic filters can be changed functionally (i.e., adding new terms per new marketing requirements) and in the time domain, (e.g., to cover X out of Y block of network addresses for Z amount of time). For example, the network device may operate in a time division mode so as to cover most or all users for research and/or content insertion purposes when spread over time. This may be adequate for residential users that are bound to their ISPs for months or years.

The filter term may also include a counter or rate-limiter designed to prevent the in-line ad engine from being overloaded. For example, only traffic not exceeding a certain threshold may be accepted for processing. At the same time, the operation of the in-line ad engine does not affect the speed or charter of operation of the general-purpose packet processing network device.

In another aspect of the invention, the forwarding plane of the network device may include a packet redirector used for handling those packets matching the dynamic filters by diverting the packets to the appropriate component of the network device for inspection by the in-line ad engine physically residing in the network device. The forwarding plane may also include a packet duplicator that duplicates packets of interest identified by the filters and injects the duplicate packets into the in-line ad engine for data mining. Duplication may be used for traffic that does not need modification and hence can be discarded after processing as the traffic does not have to be modified and returned into the network.

When the packet redirector or the packet duplicator directs the traffic of interest to the in-line ad engine for inspection, the traffic physically is switched from the data path of the general-purpose network device to a service card having the packet inspection engine of the in-line ad engine via bus or crossbar that interconnects components within the network device. The packet inspection engine may perform a variety of searches and/or packet-related algorithms according to policy for purposes of data mining information relevant to advertisement. For example, the packet inspection engine may perform a keyword search, a regular expression search, fixed offset data extraction, connection state and content caching, and other searches or packet-related algorithms.

Further, the packet inspection engine may optionally further direct the traffic to a packet modification engine, which may rewrite certain portions of the application-layer data carried by payloads of the packets, inject packets into the packet flow, or remove packets from the packet flow, and perform other actions required to alter the application-layer data carried by the stream of data traffic. In some cases, modified packets can be returned back into the forwarding path of the network device for output to the network. If duplicate packets were created, the duplicate packets and subsequently processed by the packet inspection engine, the duplicate packets may be dropped after examination. Otherwise, the examined and/or modified packets are injected back into the data path of the network device for normal packet processing in the egress direction.

Another aspect of the invention is directed to the structure of control exercised over hardware elements of the network device. In one embodiment, a dedicated control board is installed as a service card within the network device and performs computationally intensive tasks associated with building and maintaining operational policies for the dynamic filters, the packet redirector, the packet inspection engine, and the packet modification engine, i.e., the low-level functions of hardware. Microcode of the hardware elements of the network device (such as those data plane hardware elements responsible for packet forwarding) can be controlled by higher layers of software with a software application interface (API). This decouples hardware and software resources of the in-line ad engine from those of the network device. The dedicated control board may run software, including software offered by companies not associated with a vendor of the network device, (i.e., third-party vendors). Therefore, instead of operating on a fixed set of policies and actions defined by a vendor of the network device, the in-line ad engine can be adapted to a variety of policy, control, or reporting structures required for the online market research and advertising industry.

The techniques described herein may provide one or more advantages. For example, the architecture described herein may be incorporated within a network device that utilizes a general-purpose embedded (in-line) packet processing engine of a hardware-based forwarding architecture. Thus, the architecture may easily be incorporated within high-end network devices that are used for variety of purposes, including acceleration, stateful packet inspection, data caching, quality of service (QoS) monitoring and others. This may avoid the use of standalone network ad engine, which may be a bottleneck for network traffic.

In one embodiment, a network router comprises a plurality of interfaces configured to send and receive packets, a routing engine comprising a control unit that executes a routing protocol to maintain routing information specifying routes through a network, a packet forwarding engine configured by the routing engine to apply forwarding information to select next hops for the packets and forward the packets to the interfaces in accordance with the routing information, and one or more advertising engine service cards comprising a packet inspection engine and an advertising engine control unit. The packet forwarding engine stores a set of dynamic filters that identify packets for inspection by the packet inspection engine based on characteristics of the packet, and the packet forwarding engine applies the set of dynamic filters to the received packets and directs any matching ones of the packets from the packet forwarding engine to the packet inspection engine within the advertising engine service card. The packet inspection engine of the advertising engine analyzes the packets to extract information from the packets based on configured advertising engine policies. The advertising engine control unit outputs commands to dynamically reconfigure the packet forwarding engine of the router to dynamically add and delete filters from the set of dynamic filters applied by the packet forwarding engine.

In a further embodiment, a method comprises receiving packets at a plurality of interfaces of a router, maintaining routing information specifying routes through a network by executing a routing protocol on a control unit of a routing engine of the router, selecting next hops for the packets within the network with a packet forwarding engine configured by the routing engine, forwarding the packets to the interfaces in accordance with the routing information, storing a set of dynamic filters with the packet forwarding engine, wherein the dynamic filters identify packets for inspection by a packet inspection engine configured on an advertising engine service card of the router based on characteristics of the packets, applying the set of dynamic filters to the received packets, directing any matching ones of the packets from the packet forwarding engine to the packet inspection engine within the advertising engine service card, analyzing the packets to extract information from the packets based on configured advertising engine policies, and outputting commands to dynamically reconfigure the packet forwarding engine of the router to dynamically add and delete filters from the set of dynamic filters applied by the packet forwarding engine.

In another embodiment, network switch comprises a plurality of interfaces configured to send and receive packets, a forwarding plane that makes forwarding decisions to select next hops for the packets and forward the packets to the interfaces in accordance with the selected next hops, one or more advertising engine service cards comprising a packet inspection engine and an advertising engine control unit, wherein the forwarding plane stores a set of dynamic filters that identify packets for inspection by the packet inspection engine based on characteristics of the packet, wherein the forwarding plane applies the set of dynamic filters to the received packets and directs any matching ones of the packets from the forwarding plane to the packet inspection engine within the advertising engine service card, wherein the packet inspection engine of the advertising engine analyzes the packets to extract information from the packets based on configured advertising engine policies, and wherein the advertising engine control unit outputs commands to dynamically reconfigure the forwarding plane of the network switch to dynamically add and delete filters from the set of dynamic filters applied by the forwarding plane.

In a further embodiment, a computer-readable storage medium comprises instructions for causing a programmable processor to receive packets at a plurality of interfaces of a router, maintain routing information specifying routes through a network by executing a routing protocol on a control unit of a routing engine of the router, select next hops for the packets within the network with a packet forwarding engine configured by the routing engine, forward the packets to the interfaces in accordance with the routing information, store a set of dynamic filters with the packet forwarding engine, wherein the dynamic filters identify packets for inspection by a packet inspection engine configured on an advertising engine service card of the router based on characteristics of the packets, apply the set of dynamic filters to the received packets, direct any matching ones of the packets from the packet forwarding engine to the packet inspection engine within the advertising engine service card, analyze the packets to extract information from the packets based on configured advertising engine policies, and output commands to dynamically reconfigure the packet forwarding engine of the router to dynamically add and delete filters from the set of dynamic filters applied by the packet forwarding engine.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
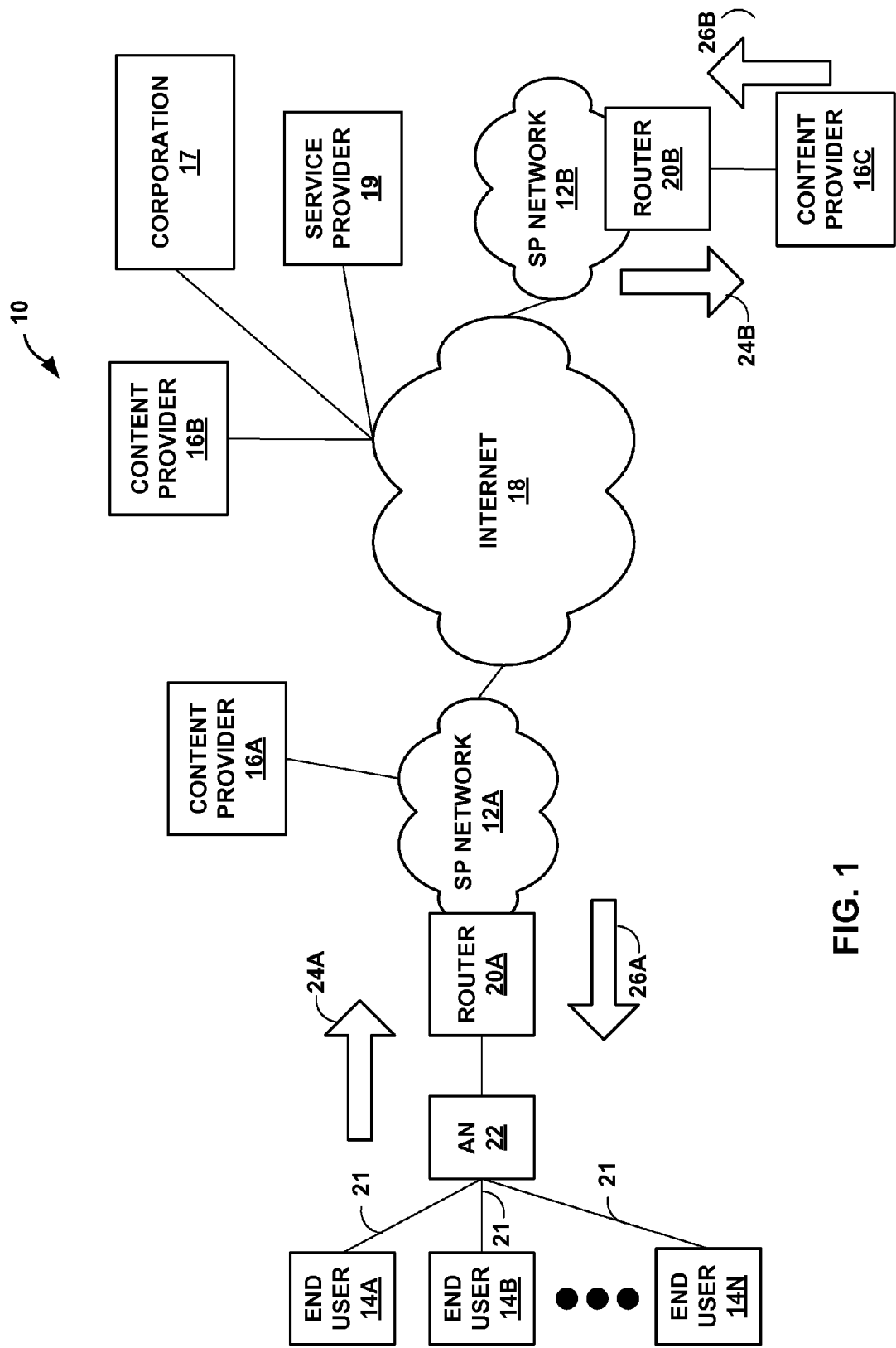
FIG. 1 is a block diagram illustrating an example system in which service provider networks provide connectivity among end users, content providers, and the Internet.

FIG. 1 is a block diagram illustrating an example system 10 in which service provider (SP) networks 12A-12B ("SP networks 12") provide connectivity among end users 14A-14N ("end users 14"), content providers 16A-16C ("content providers 16"), corporation 17, service provider 19, and the Internet 18. Routers 20A-20B ("routers 20") provide routing and advertising engine ("ad engine") services for SP networks 12A and 12B, respectively, in accordance with various embodiments of the invention. Each of end users 14 connects to access nodes ("AN") 22 via one or more access links 21A-21N ("access links 21"). In some cases, access links 21 may be wireless access links. Although system 10 may include any number of end users 14 coupled to SP network 12A by any number of access nodes 22, for simplicity, FIG. 1 shows only end users 14 coupled to SP network 12A by access node 22. End users 14 may be geographically distributed end user customers. For example, end users 14 may include one or more devices (not shown), such as personal computers, laptop computers, handheld computers, workstations, servers, routers, switches, printers, fax machines, or the like.

Network traffic from end users 14 is aggregated into SP network 12A and is routed towards destinations. The destinations of traffic from end users 14 may include content providers 16A-16C, corporation 17, service provider 19, or other destinations associated with the Internet 18. The traffic from end users 14 forms an "upstream" traffic flow 24A. For example, upstream traffic flow 24A may include queries by end users 14, such as requests or keywords, as well as user preferences for end users 14. The upstream traffic flow 24A flows through router 20A of SP network 12A. In response, SP network 12A may receive a "downstream" traffic flow 26A from content providers 16 or other sources directed towards end users 14. For example, the downstream traffic flow 26A may include data or content requested by end users 14.

In addition, SP network 12B provides connectivity to the Internet 18 for content provider 16C via router 20B. In a similar manner, upstream traffic flow 24B originating from users 14 or other originators flows through router 20B, as does downstream traffic flow 26B from content provider 16C destined for end users 14 or other destinations.

In accordance with one example embodiment of the invention, each of routers 20A and 20B include an in-line advertising engine ("ad engine") capable of inspecting packets of interest at line rates. Routers 20 process transit traffic flowing at very high speeds (such as up to line rate) by applying normal routing functions. For example, routers 20 may process data at a line rate of multi-terabit bandwidth rates. Each of routers 20 includes a hardware-based forwarding engine having one or more specialized packet forwarding integrated circuits. Moreover, each of routers 20 are capable of applying one or more dynamic lossless packet filters within the hardware-based forwarding path so as to identify traffic of interest from upstream packet flows 24 and downstream packet flows 26, and to direct the traffic of interested to the ad engine for in-line packet inspection and possibly for packet modification. For example, the dynamic filters may be configured by an administrator by way of a user interface presented by ad engine software or may be created on-the-fly to identify the traffic of interest. For example, the dynamic filters may be dynamically created by the in-line ad engine in response to ongoing packet inspection by the in-line ad engine. In either case, the dynamic filter is installed within the hardware of the forwarding path, e.g., by reprogramming a configurable portion of the hardware with criteria necessary for matching a packet flow on interest. The network device may in this manner create, apply, or remove the dynamic filters from the hardware-based forwarding path by way of an ad engine software control module reprogramming the writable portion of the hardware-based forwarding path without affecting transit traffic that is not of interest, as specified by the dynamic filters. In this manner, routers 20 may process upstream packet flows 24 and downstream packet flows 26 at high speeds while simultaneously providing packet inspection and modification by the in-line ad engine.

Referring to router 20A for example, router 20A may include a service plane (e.g., a set of one or more installable service cards) that provides one or more packet inspection engines that may perform a variety of searches and/or packet-related algorithms according to policy. For example, the packet inspection engine may perform a keyword search, a regular expression search, fixed offset data extraction, connection state and content caching, and other searches or packet-related algorithms for purposes of data mining with respect to user-related information relevant for advertisement. Further, the packet inspection engine may optionally further direct the network traffic of interest to a packet modification engine executing on the service plane. The packet modification engine may dynamically rewrite certain portions of transit packets, inject new packets into the packet flow, or remove packets from the packet flow, and perform other actions required to alter the stream of data traffic so as to present relevant advertisement material to an end user 14. For example, the packet modification engine may modify content originally sourced by any of content providers 16, such as requested web pages, emails, or instant messages, by inserting an advertisement. As another example, the packet modification engine may modify content to provide ad placement in role-playing game (RPG) and massively multiplayer online role-playing game (MMORPG) environments. In some cases, modified packets can be returned back into the data path of router 20A. If duplicate packets were created, the duplicate packets may be dropped after examination. Otherwise, the examined and/or modified packets are injected back into the data path of the router 20A for normal packet processing in the egress direction.

Although described for purposes of example in terms of routers 20 that provide an integrated in-line ad engine, the techniques described herein may be applied to switches, servers, or other network devices consistent with the principles of the invention. For example, a layer two (L2) switch that intelligently forwards traffic based on L2 identifiers of the traffic may operate according to the techniques of the invention. One example of such a L2 switch is described by application Ser. No. 11/751,731, filed on May 22, 2007, entitled LAYER TWO FIREWALL WITH ACTIVE-ACTIVE HIGH AVAILABILITY SUPPORT, the entire contents of which is incorporated by reference herein.

Figure 2:
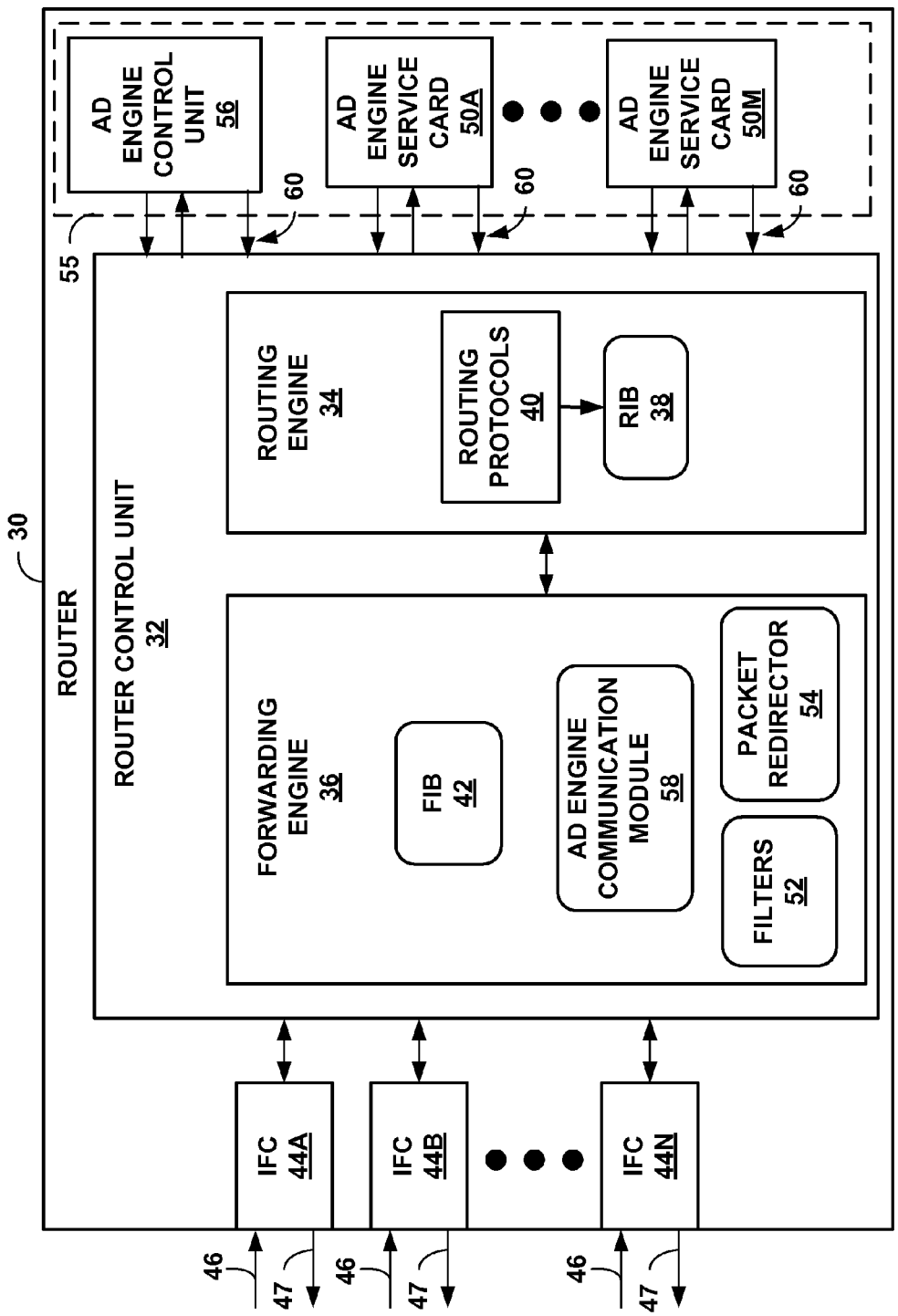
FIG. 2 is a block diagram illustrating an example router that performs in-line packet inspection and modification for market research and influence within an Internet service provider network.

FIG. 2 is a block diagram illustrating an example router 30 that includes an ad engine 55 that performs in-line packet inspection and modification for market research and influence within an Internet service provider network. Router 30 may be a router such as one of routers 20A, 20B of FIG. 1 that connect to SP networks 12A, 12B. Router 30 comprises a control unit 32 that includes a routing engine 34 and a forwarding engine 36. Routing engine 34 provides a control plane that is primarily responsible for communicating with peer routers and maintaining routing information base (RIB) 38 to reflect the current topology of a network and other network entities to which it is connected. In particular, routing engine 34 periodically updates RIB 38 to accurately reflect the topology of the network and other entities. RIB 38 maintains maintain routing information that describes routes through the network. A "route" can generally be defined as a path between two locations on the network. Upon receiving an incoming packet, router 30 examines information within the packet to identify the destination for the packet. Based on the destination, router 30 forwards the packet in accordance with the routing information of RIB 38. Routing engine 34 provides an operating environment for execution of routing protocols 40 that perform such routing operations. Router 30 includes interface cards 44A-44N ("IFCs 44") that receive and send packets via network links 46 and 47, respectively. IFCs 44 may be coupled to network links 46, 47 via a number of interface ports.

Router 30 may, for example, be a high-end router capable of deployment within a service provider network. Moreover, a packet forwarding plane of forwarding engine 36 may be provided by dedicated forwarding integrated circuits normally associated with high-end routing and forwarding components of a network router. In one embodiment, forwarding engine 36 comprises a multi-stage switch fabric that relays packets between components of router 30. U.S. Patent Application No. 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application No. 2008/0044181 are incorporated herein by reference.

RIB 38 may maintain the routing information in the form of one or more routing tables. The routing tables stores routes through the network, and generally represent the topology of the network. The form and contents of the routing tables may depend on the routing algorithm implemented by router 30. Common routing algorithms include distance vector routing algorithms, path vector routing algorithms and link-state routing algorithms. Many of these algorithms make use of the concept of a "hop," which refers to a connection between two devices. Consequently, the distance between two devices is often measured in hops. Furthermore, in reference to routing a packet, the "next hop" from a network router typically refers to a neighboring device along a given route.

Router 30 may be a high-speed router, and routing engine 34 may generate forwarding information accordance with the routing information. In particular, routing engine 34 processes the routing information and other information (such as an access control list or packet processing policy) to select routes to each destination. Based on the selection process, routing engine 34 generates an action for each destination. This action could be to forward the packet according to forwarding information that associates destinations with specific next hops and ultimately to output ports of the router. Other examples of actions include dropping the packet, counting or logging the packet, or sending the packet to multiple destinations, or combinations of such actions. The term "next hop action" will refer in general to any forwarding decision made on a packet. Thus, in accordance with RIB 38, forwarding engine 36 maintains forwarding information base (FIB) 42 that associates network destinations with specific next hops and corresponding interface ports. For example, routing engine 34 analyzes RIB 38 to perform route selection and generates FIB 42 in accordance with RIB 38 based on selected routes.

Routing engine 34 may generate FIB 42 in a tree-like structure, such as a radix tree having a number of leaf nodes that represent destinations within the network. U.S. Pat. No. 7,184,437 provides details on an exemplary embodiment of a router that utilizes a radix tree for route resolution, the contents of which is incorporated herein by reference in its entirety. Upon receiving a packet, forwarding engine 36 of router 30 uses the forwarding information to select a next hop and output port to which a packet will be forwarded. For example, forwarding engine 36 traverses the nodes of the forwarding tree until reaching a leaf node to make a forwarding decision. Each node within the forwarding tree may define a single bit comparison. For example, each node may define a test for a specific bit of a destination "key" read from the packet. Based on the results of each comparison, router 30 selects another node of the forwarding tree, thereby traversing the tree until a leaf node is reached. The bits tested are referred to as path control bits; the values of the path control bits determine a path through the forwarding tree by a sequence of forwarding tree decisions. The end node of this path determines the next hop action, i.e., the packet forwarding decision. When forwarding a packet, forwarding engine 36 traverses the radix tree to a leaf node based on information within a header of the packet to ultimately select a next hop and output interface to which to forward the packet. Based on the selection, forwarding engine 36 may output the packet directly to the output interface or, in the case of a multi-stage switch fabric of a high-end router, may forward the packet to subsequent stages for switching to the proper output interface.

Generally, forwarding engine 36 provides a high-speed, hardware-based forwarding plane having a set of dedicated, forwarding integrated circuits. In addition, the forwarding integrated circuits of forwarding engine 36 can apply filters 52 in real-time and at line rates to transit packets forwarding by router 30. Filters 52 may each include matching criteria and one or more corresponding actions. A filter may include multiple filter terms. Filters 52 may cause packet redirector 54 component of the forwarding plane to relay certain packets received from IFCs 44 to ad engine service cards 50A-50M ("ad engine service cards 50") for further inspection in accordance with filters 52. That is, for packets of interest having header information matching criteria set forth within filters 52 (e.g., five tuple information such as source address, destination address, source port, destination port, and protocol), packet redirector assign a tag to the matching packets and move the packets to a packet redirector that may load balance the matching packet flows across the ad service engine cards 50. Ad engine service cards 50 receive packets from forwarding engine 36, selectively provide ad engine services based on information within the packets, and may drop the packets or relay the packets back to control unit 32 for forwarding and output by forwarding engine 36. A number of input and output logical interfaces may by used to logically couple ad engine service cards 50 to control unit 30.

Ad engine control unit 56 provides a dedicated control board that performs computationally intensive tasks associated with building and maintaining operational policies for the dynamic filters 52, packet redirection by packet redirector 54, and packet inspection modification by ad engine service cards 50. In this manner, router control unit 32 and ad engine control unit 56 each include separate hardware and software resources, and may be connected by a high-speed backplane. Ad engine control unit 56 may provide an operating environment of executing software, including software offered by companies not associated with a vendor of the network device, (i.e., third-party vendors). Therefore, instead of operating on a fixed set of policies and actions defined by a vendor of the network device, the ad engine control unit 56 can be adapted to a variety of policy, control, or reporting structures required for the online market research and advertising industry.

Filters 52 are dynamic filters applied within the forwarding plane of router 30 (i.e., within forwarding engine 36), and can be based on variety of dynamically defined criteria associated with incoming packets. As noted above, the criteria may include, for example, source and destination addresses, ports, and any other packet header information that can be processed at high speeds (i.e., line-rate). The operation of the filters 52 may cause forwarding engine 36 to pass the packets to packet redirector 54, which diverts those packets of interest for further analysis without affecting the rest of the traffic. Packet redirector 54 may in some cases duplicate the traffic and redirect the duplicated traffic to service cards 50 for inspection while allowing the original traffic to be processed by router 30 as usual. For example, packet redirector 54 may be programmed to perform particular actions upon receiving packets that have been assigned particular tags by forwarding engine 36 in applying the filters 53. For example, and action that packet redirector 54 may apply is replication and directing the packet to a destination of a packet inspection engine on a service card 50.

It is possible that only a small portion of overall transit packets are actually passing through ad engine service cards 50 at any given point of time. However, given the dynamic nature of the filters 52, filters 52 may, if needed, cover the entire of transit traffic array in the time domain, one section at a time. For example, the dynamic filters 52 may be applied to identify packets associated with specific groups of users over time, specific server destinations over time, specific applications, and other classes of traffic that are identified as the most likely to yield useful data. The ability to set the filters 52 according to time domains may be particularly beneficial in managing analysis of the large amount of network traffic flowing through router 30. For example, the network device may operate in a time division mode so as to cover most or all users for research and/or content insertion purposes when spread over time. This may be adequate for residential users that are bound to their ISPs for months or years. A filter term may also include a counter or rate-limiter designed to prevent the in-line ad engine from being overloaded. For example, only traffic not exceeding a certain threshold may be accepted for processing. For example, one or more of the dynamic filters includes a rate-limiting filter term that directs the packet forwarding engine to direct matching ones of the packets from the packet forwarding engine to the packet inspection engine when a rate at which the matching ones of the packets is received is below a threshold, and directs the packet forwarding engine to drop the matching ones of the packets when the rate exceeds the threshold. At the same time, the operation of the in-line ad engine does not affect the speed or charter of operation of the router 30.

One example of a filter within filters 52 is as follows:
Term 1. Match on IP protocol+TCP protocol+destination addresses belonging to a list A. Move matching packets to term 2. Accept non-matching packets for normal routing.
Term 2. Measure traffic rate hitting term 2 against a preconfigured limit L. Move traffic within limit L to term 3. Accept excess traffic (out of limit) for routing.
Term 3. Replicate incoming traffic, mark copies with tag AA and send them to online ad engine. Accept all packets for normal routing.

Forwarding engine 36 may interface with ad engine control unit 56 and ad engine service cards 50A by way of ad engine communication module 58 running on forwarding engine 36. For example, ad engine control unit 56 and ad engine service cards 50A may provide commands 60 in the form of backplane messages that are received by ad engine communication module 58 to add, delete, or modify filters 52. For example, ad engine service cards 50 may issue commands 60 directing installation of dynamic filters on-the-fly to filters 52 based on packet inspection. For example, a particular user's web requests may be identified as of interest, e.g., for particular a demographic study. Ad engine service card 50A may provide a command 60 that installs a new filter to filters 52 that specifically filters traffic from the user, e.g., based on the user's IP address and other information. In response, ad engine communication module 58 may invoke an interface presented by the underlying forwarding integrated circuits (ASICs) to write data to a programmable memory of the ASICs so as to specify the packet flow criteria of a filter. Ad engine control unit 58 and ad engine service cards 50 will be described in further detail below with respect to FIGS. 3 and 4. Ad engine control unit 58 may be provided on a service card in addition to or in common with one of ad engine service cards 50.

In one embodiment, each of forwarding engine 36 and routing engine 34 may comprise one or more dedicated processors, hardware, and the like, and may be communicatively coupled by a data communication channel. The data communication channel may be a high-speed network connection, bus, backplane, shared-memory or other data communication mechanism. Router 30 may further include a chassis (not shown) for housing control unit 32. The chassis has a number of slots (not shown) for receiving a set of cards, including IFCs 44 and ad engine service cards 50. Each card may be inserted into a corresponding slot of the chassis for electrically coupling the card to control unit 32 via a bus, backplane, or other electrical communication mechanism. Although shown for purposes of example as being located within the body of router 30, ad engine control unit 56 may alternatively be positioned outside of an enclosure of router 30 but may still be connected to internal system busses of router 30. Thus, traffic being sent between router control unit 32 and ad engine control unit 56 does not traverse links external to router 30

Router 30 may operate according to executable instructions fetched from a computer-readable storage medium (not shown). Examples of such media include random access memory (RAM), read-only memory (ROM), non-volatile random access memory (NVRAM), electrically erasable programmable read-only memory (EEPROM), flash memory, and the like. The functions of network device 30 may be implemented by executing the instructions of the computer-readable storage medium with one or more processors, discrete hardware circuitry, firmware, software executing on a programmable processor, or a combination of any of the above.

Figure 3:
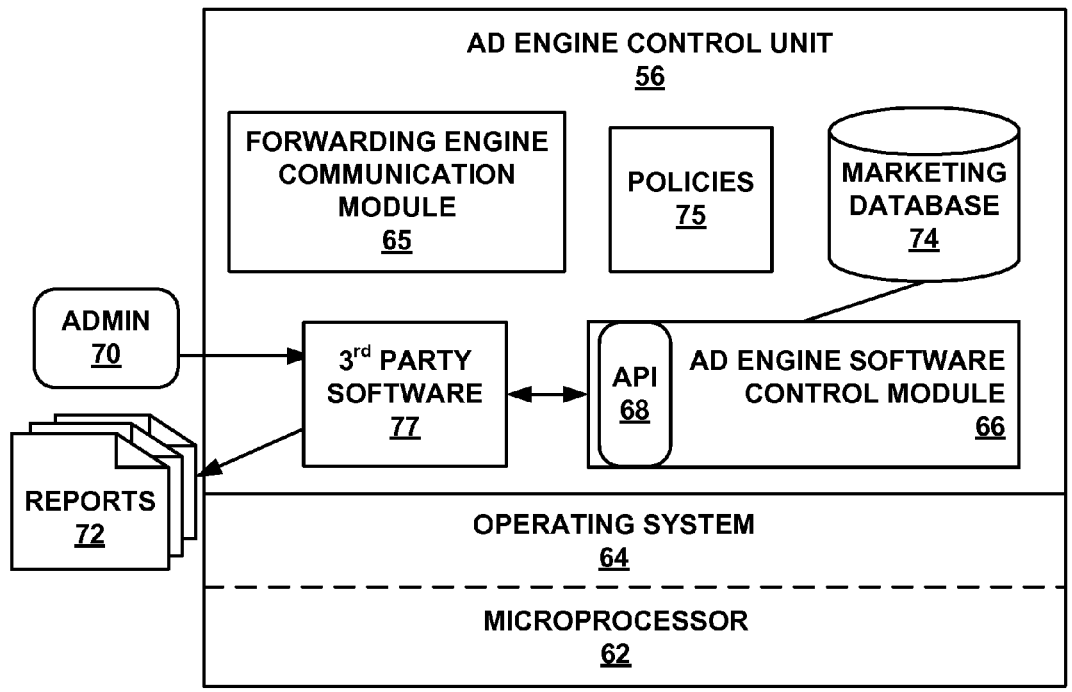
FIG. 3 is a block diagram illustrating an example ad engine control board of the router of FIG. 2 that provides software control to components within the router of FIG. 2 for performing in-line packet inspection and modification for market research and influence.

FIG. 3 is a block diagram illustrating in further detail an example ad engine control unit 56 that may be installed within the router 30 of FIG. 2 in further detail. Ad engine control unit 56 provides software control to components within the router of FIG. 2 for performing in-line packet inspection and modification for market research and influence. Ad engine control unit 56 may include a microprocessor 62 that executes an operating system 64 and processes within ad engine control unit 56. Operating system 64 may represent a module that provides a standard operating system, such as a real-time operating system or a Unix-based operating system, an operating system dedicated to processing of packet or other data units, or any other conventional operating system. In some embodiments, operating system 64 may be isolated from an overall operating system of router 30.

Ad engine control unit 56 may include processes that execute on top of operating system 64. As shown in FIG. 3, these processes may include ad engine software control module 66, $3^{rd}$ party control software 77, application interface 68, and a forwarding engine communication module 65 by which ad engine control unit 56 communicates with ad engine communication module 58 of forwarding engine 36 (FIG. 2). In some embodiments, ad engine control unit 56 may include other modules, but for ease of illustration only the modules shown are included.

The processes of ad engine control unit 56 may execute "on top of" operating system 64 in the sense that operating system 64 provides an execution environment in which the processes may execute. In other embodiments, the processes may execute as stand-alone modules that do not require operating system 64 to provide an execution environment. Although certain processes may be described herein as implemented in software, the techniques of the invention contemplate that these software modules may be implemented as either a standalone hardware module or a combination of both hardware and software. Thus, the principles of the invention should not be strictly limited to the illustrated embodiment.

Ad engine software control module 66 provides an application interface (API) 68 that allows $3^{rd}$ party software 77 to be installed (e.g., or other pluggable control software). This software provides high-level control and presents a user interface by which an administrator 70 ("ADMIN 70") is able to interface with the ad engine software of ad engine software control module 66. For example, administrator 70 may configure filters 52 of forwarding engine 36 by way of the user interface to specify the types of packets to be filtered for market research and influence. As another example, administrator 70 may interact with the user interface to of $3^{rd}$ party software 77 to request reports 72 which are generated based on data received from ad engine software control module 66 by way of API 68. Administrator 70 may be part of a market research organization that formulates queries or policies in order to study certain aspects of the network traffic.

In some embodiments, $3^{rd}$ party software 77 may be an ad engine software provided by a third-party vendor distinct from a vendor of router 30. $3^{rd}$ party software 77 may be an off-the-shelf ad engine software that may be plugged in to ad engine control unit 56 by way of API 68. Ad engine software control module 66 or $3^{rd}$ party software 77 may maintain a marketing database 74. Alternatively marketing database 80 may be maintained external to router 30. Ad engine software control module 66 may compile data collected from ad engine service cards 50 and store the data to marketing database 74 for subsequent analysis. In some cases, ad engine software control module 66 or $3^{rd}$ party software 77 may perform market research analysis on the collected data. Ad engine software control module 66 or $3^{rd}$ party software 77 may also update a customer profile maintained for a specific end user based on data collected about the end user. The administrator 70 may interact with ad engine software control module 66 by way of the user interface to configure policies 75, which may include a policy such as "capture all keywords to Google searches." Ad engine software control module 66 or $3^{rd}$ party software 77 may break this task down into individual assignments for components under the control of ad engine software control module 66 or $3^{rd}$ party software 77, i.e., filters 52, packet redirector 54, and packet inspection engines and packet modification engines running on ad engine service cards 50. Although not shown in FIG. 3, ad engine control unit 56 may be implemented on a removable card having an electronic interface suitable for removable installation within a communication backplane of router 30.

Figure 4:
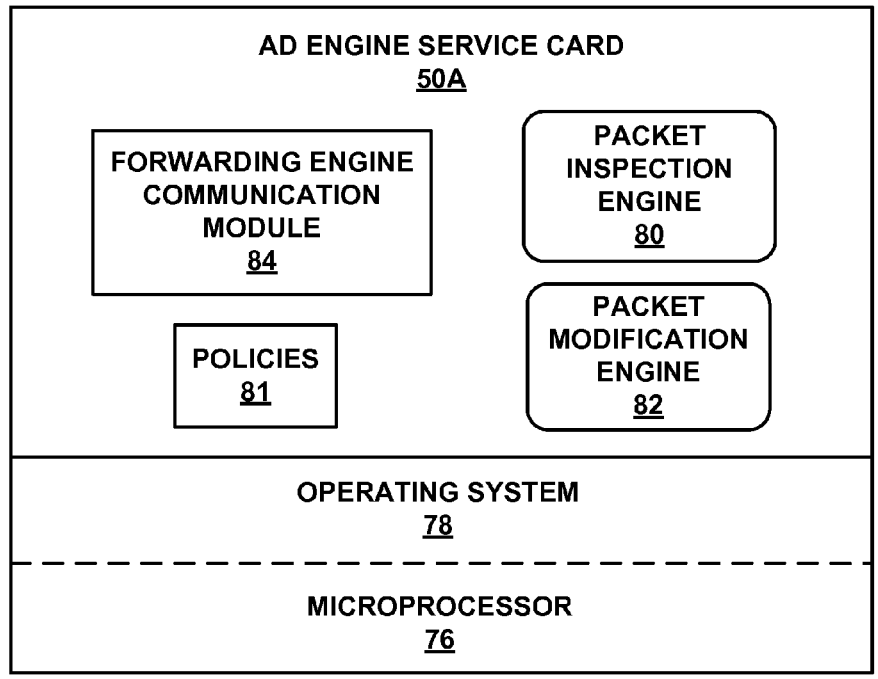
FIG. 4 is a block diagram illustrating an example ad engine service card of the router of FIG. 2 that performs in-line packet inspection and modification for market research and influence.

FIG. 4 is a block diagram illustrating in further detail an example ad engine service card 50A that may be installed within router 30 of FIG. 2. Ad engine service card 50A performs in-line packet inspection and modification of packets received by router 30 for market research and influence purposes. Ad engine service card 50A may include a microprocessor 76 that executes an operating system 78 and a number of software processes. As shown in FIG. 3, these processes may include packet inspection engine 80 that inspects packets directed to ad engine service card 50A by packet redirector 85. The processes also include a packet modification engine 82 that dynamically modifies the packets if needed, and a forwarding engine communication module 65 by which ad engine service card 50A communicates with ad engine communication module 58 of forwarding engine 36 (FIG. 2). In some embodiments, ad engine service card 50A may include other modules, but for ease of illustration only the modules shown are included.

Although shown for purposes of example as having packet inspection engine and packet modification engine on a single ad engine service card 50A, in some embodiments packet inspection engine and packet modification engine may reside on separate ad engine service cards 50, such as dedicated service cards.

Overall operation of router 30 of FIG. 2 in the life of an upstream packet and a downstream packet received by router 30 will now be described with reference to FIGS. 2-4. As one example, router 30 may scan packets received within an upstream packet stream 24A for data that may be useful for marketing purposes. Upon upstream packet flow 24A entering an ingress one of IFCs 44, forwarding engine 36 applies filters 52 to identify packets within the upstream packet flow 26A as being of interest or not. When packets match one of filters 52, forwarding engine 36 may pass the packet to packet redirector 58 in accordance with the filter. Packet redirector 58 may duplicate the filtered packets and redirect the duplicated filtered packets, or may simply redirect the original packets, as specified by the matching filter. Packet redirector 58 redirects the filtered packets (or duplicate packets) to one of ad engine service cards 50. For example, packet redirector 58 may load balance the packets across ad engine service cards 50A-50M, or may redirect the packets to an appropriate one of service cards 50 based on the filter.

In the ad engine service card (e.g., ad engine service card 50A), the filtered packet enters a packet inspection engine 80, which analyzes the packet for keywords and other targeted pieces of information. As examples, packet inspection engine 80 may search for packets having an HTML body, packets having HTML "preferred language tags," or packets having a particular string match. In some cases, packet inspection engine 80 may perform deep packet inspection or may involve some form of message reassembly, including reassembly of application-layer data from the payloads of the packets. Packet inspection engine 80 may perform certain actions upon finding packets having the information for which packet inspection engine 80 is configured to look. The actions may be specified as part of the filters 52 or may be configured on ad engine service card 50A as policies 81. Example actions include: recording results along with a source IP address on finding a unique match, logging the results every time a unique source-destination IP address pair is found. Packet inspection engine 80 may provide the results of the inspection to ad engine control module 66 or $3^{rd}$ party software 77 within ad engine control unit 56. Packet inspection engine 80 may be instructed as to what keywords or other information that packet inspection engine 80 is searching for by virtue of the filter, which may specify this, or by virtue of policies 81 stored locally on ad engine service card 50A. In the case that the packet is a duplicate, the duplicate packet may be dropped after inspection. Meanwhile, the original packets that had matched the filter and triggered duplication continue to traverse router control unit 32 and switch fabric (not shown) of router 30 in a normal fashion as though ad engine functionality did not exist on router 30.

As another example, router 30 may scan packets within a downstream packet flow 26B for marketing data and/or to identify traffic relevant for ad insertion purposes. In a manner similar to that of the upstream direction, upon downstream packet flow 26B entering an ingress one of IFCs 44, forwarding engine 36 applies filters 52 to identify packets within the downstream packet flow 26B as being of interest or not. When packets match one of filters 52, forwarding engine 36 may pass the packet to packet redirector 58 in accordance with the filter. Packet redirector 58 may duplicate the filtered packets and redirect the duplicated filtered packets, or may simply redirect the original packets, as specified by the matching filter. Packet redirector 58 redirects the filtered packets (or duplicate packets) to one of ad engine service cards 50. For example, packet redirector 58 may load balance the packets across ad engine service cards 50A-50M, or may redirect the packets to an appropriate one of service cards 50 based on the filter.

In the ad engine service card (e.g., ad engine service card 50A), the filtered packet enters a packet inspection engine 80, which analyzes the packet as described above. Packet inspection engine 80 may analyze the packet to identify certain information in the packet. Upon identifying the packet, packet inspection engine 80 may take certain actions as specified by the matching filter or policies 81. For example, packet inspection engine 80 may provide information gleaned from the packet inspection to ad engine software control module 66 or $3^{rd}$ party software 77 of ad engine control unit 56. Based on the inspection of packets by packet inspection engine 80, service card 50A or ad engine control unit 56 may trigger online or offline marketing to be performed. For example, packet inspection engine 80 may alternatively or additionally pass the packet to packet modification engine 82 for modification of the packet or more generally, modification of the packet flow with which the packet is associated.

Packet modification engine 82 may rewrite certain portions of packets, inject or remove packets, and perform other actions required to alter the stream of data. The actions may be specified as part of the filters 52 or may be configured on ad engine service card 50A as policies 81. Packet modification engine 82 may rewrite application-layer data contained within a payload of packets to insert an advertisement within the application-layer data. For example, packet modification engine 82 may add a frame containing an advertisement to a webpage identified within a TCP session. Packet modification engine 82 may then recalculate higher-level protocol boundaries and checksums for the packets to match the added content. Packet modification engine 82 may obtain the advertisement to be inserted from a database of advertisements stored locally to router 30 or externally. For example, policies 81 or policies 75 may provide a database of advertisements to be inserted into the stream of data. As another example, $3^{rd}$ party software 77 may provide the database of advertisements.

In some cases, packet inspection engine 80 may automatically invoke forwarding engine communication module 84 to provide a command to ad engine communication module 58 of forwarding engine 36 to install a new dynamic filter based on the packet inspection. Packet inspection engine 80 may provide the instructions to install a new filter in accordance with policies 86 configured on ad engine service card 50A. Policies 86 may be configured by ad engine software control module 66 or $3^{rd}$ party software 77. Although not shown in FIG. 4, ad engine service card 50A may be implemented on a removable card having an electronic interface suitable for removable installation within a communication backplane of router 30.

Figure 5:
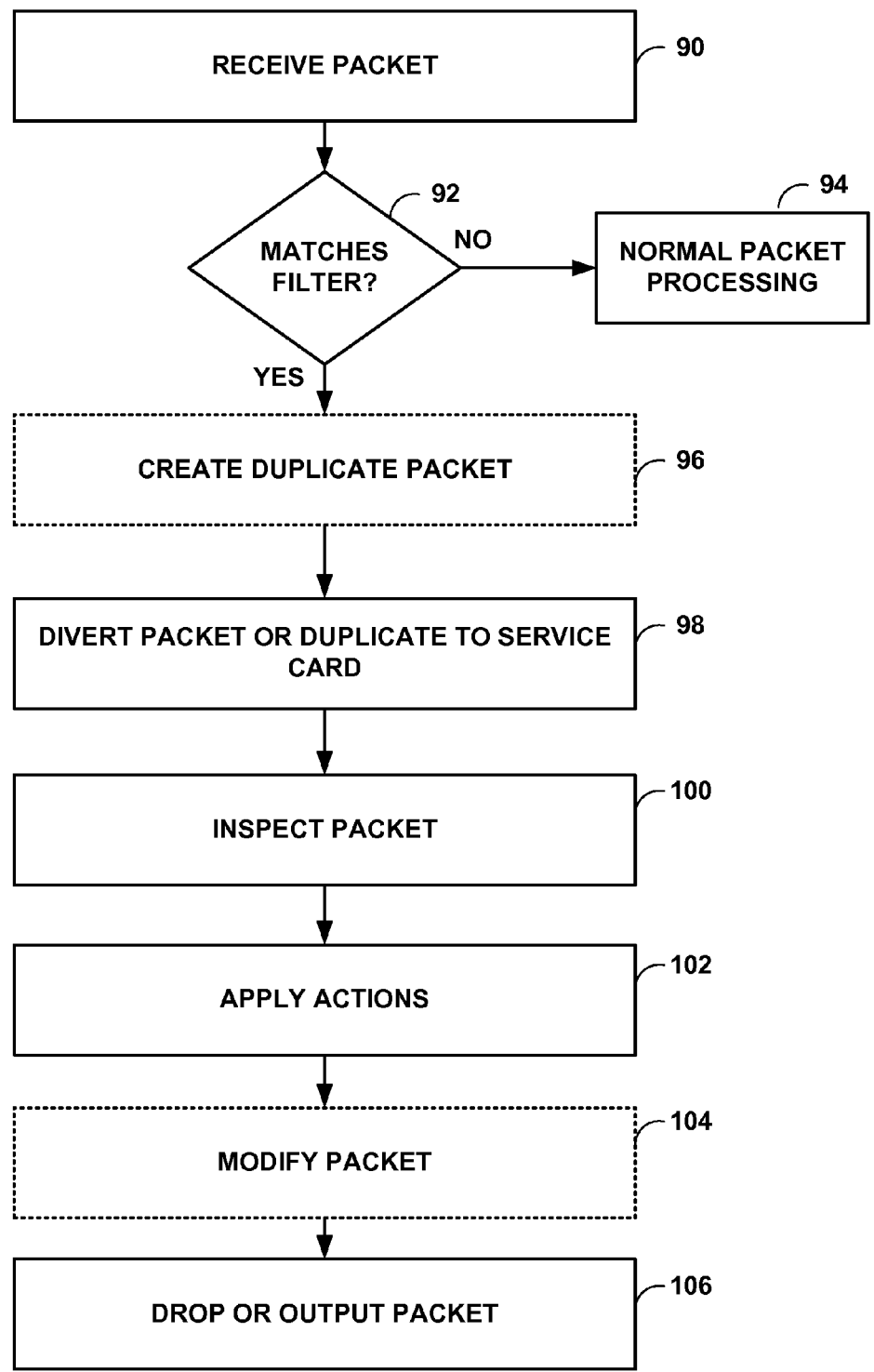
FIG. 5 is a flowchart illustrating example operation of the router of FIG. 2 in performing in-line packet inspection and modification for market research and influence consistent with the techniques of the invention.

FIG. 5 is a flowchart illustrating example operation of the router 30 of FIG. 2 in performing in-line packet inspection and modification for market research and influence consistent with the techniques of the invention. Router 30 may receive a packet, such as a packet within an upstream packet flow from a user to a content service provider or a downstream packet flow from a content service provider to a user (90). Forwarding engine 36 applies filters 52 to identify packets within the downstream packet flow 26B as being of interest or not (92). If the packet does not match any filters, router 30 may process the packet according to normal routing functionality (94). When packets match one of filters 52, forwarding engine 36 may pass the packet to packet redirector 58 in accordance with the filter. Packet redirector 58 may optionally duplicate the filtered packets (96) and redirect the duplicated filtered packets, or may simply redirect the original packets, as specified by the matching filter. Packet redirector 58 redirects the filtered packets (or duplicate packets) to one of ad engine service cards 50 (98). For example, packet redirector 58 may load balance the packets across ad engine service cards 50A-50M, or may redirect the packets to an appropriate one of service cards 50 based on the filter.

In the ad engine service card (e.g., ad engine service card 50A), the filtered packet enters a packet inspection engine 80, which analyzes the packet as described above. Packet inspection engine 80 may analyze the packet to identify certain information in the packet (100). Upon identifying the packet, packet inspection engine 80 may take certain actions as specified by the matching filter or policies 81 (102). For example, packet inspection engine 80 may provide information gleaned from the packet inspection to ad engine software control module 66 or $3^{rd}$ party software 77 of ad engine control unit 56, or may compile or log the information. As another example, packet inspection engine 80 may alternatively or additionally pass the packet to packet modification engine 82 for modification of the packet or more generally, modification of the packet flow with which the packet is associated. Packet modification engine 82 may modify the packet (104). Ad engine service card 50A may drop the packet upon completion of the tasks specified by the filter or the policies, or may output the packet (e.g., in the case of packet modification) to the specified destination (106).

Figure 6:
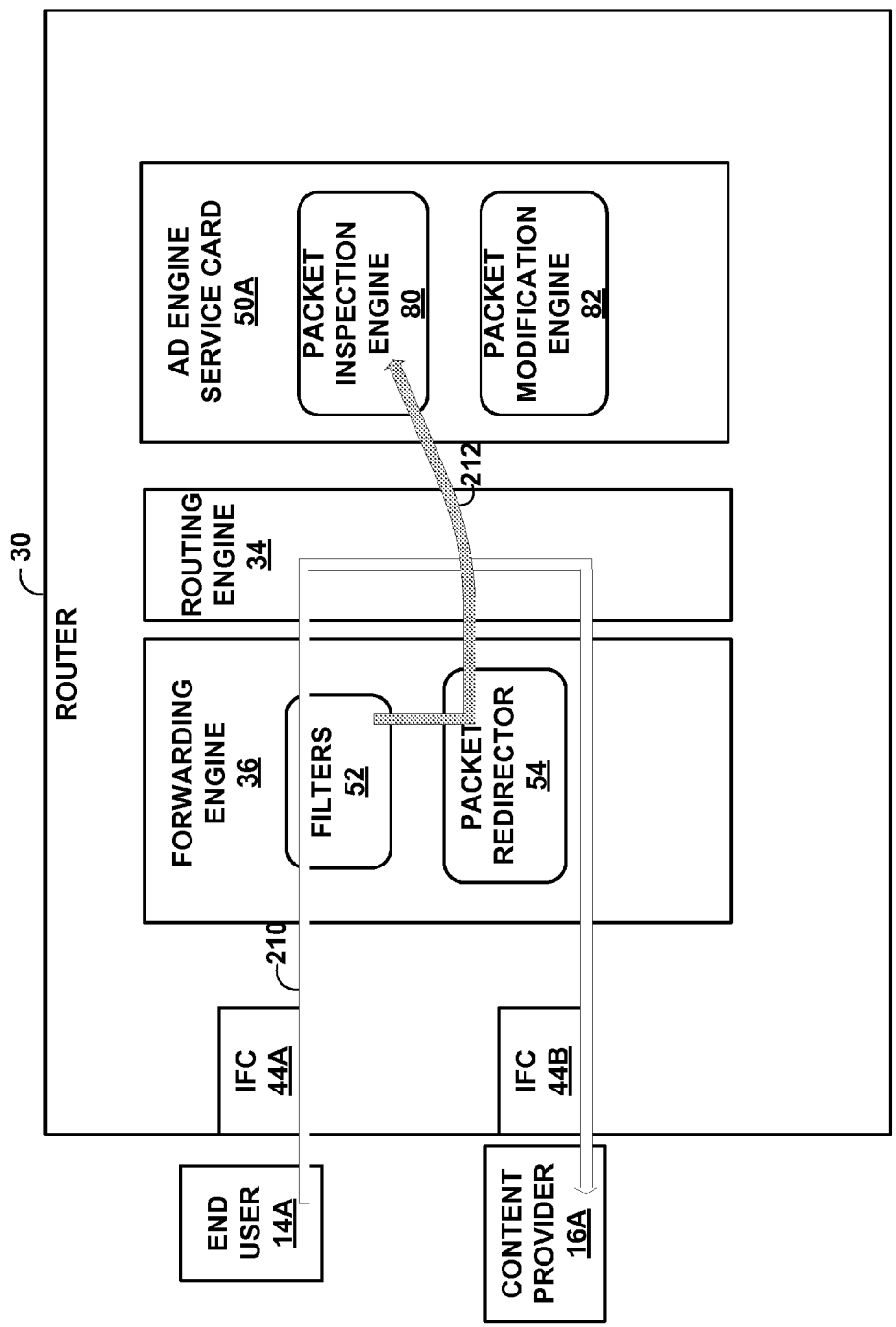
FIG. 6 demonstrates a packet path within a router or switch for the upstream traffic FIG. 7 demonstrates a packet path within router or switch for the downstream traffic, which may be modified for ad insertion purposes.
Figure 7:
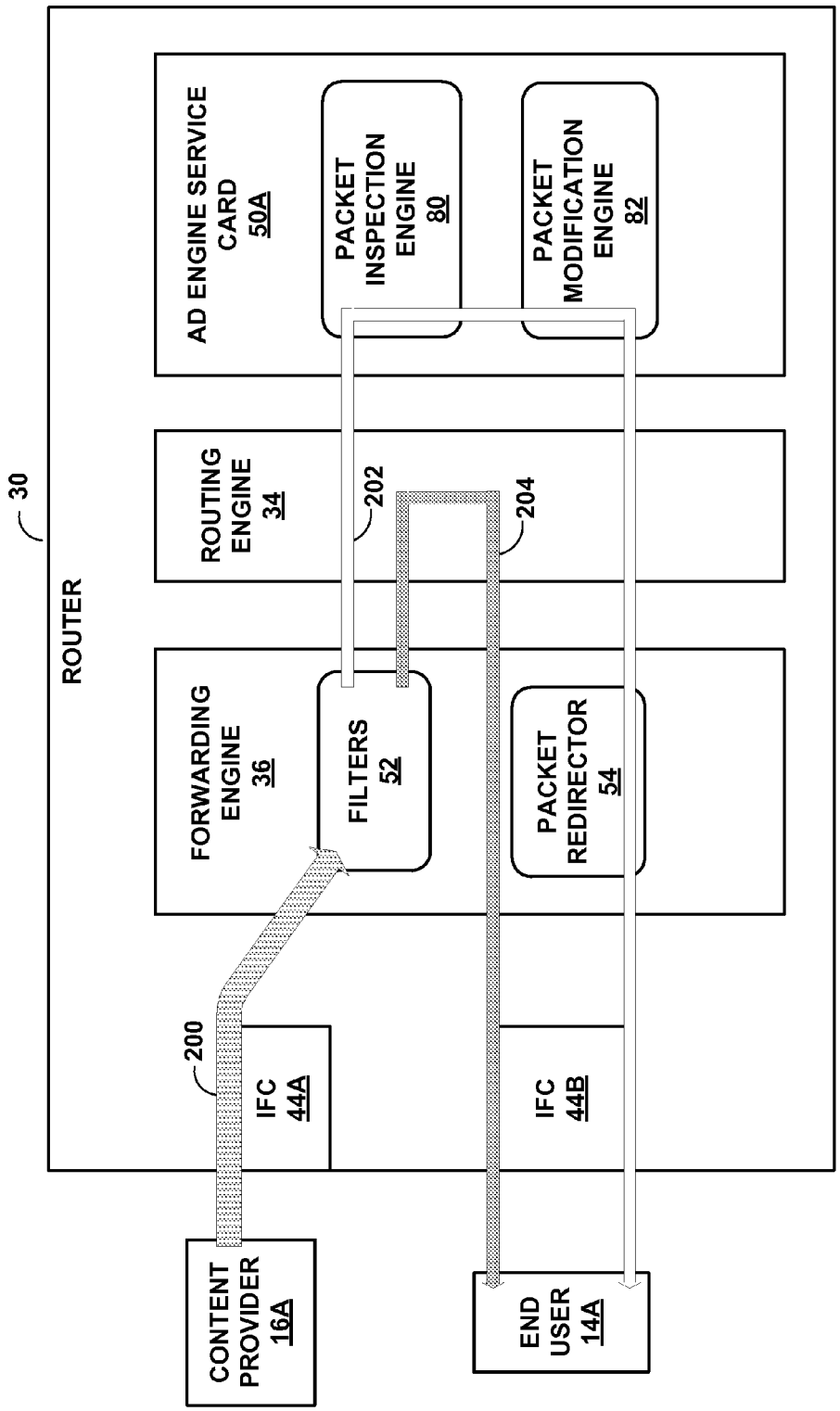

FIGS. 6 and 7 depict a simplified, example host system with present invention in place. FIG. 6 demonstrates a packet path for the upstream traffic, which is being scanned for marketing data. Upon entering router 30 via interface card 44A, traffic gets separated into "interesting" and non-interesting in filters 52. Packet redirector 54 replicates the "interesting" traffic and sends copies 212 over to online ad engine, implemented as one or several service card(s). In the upstream scan case, the replica of the "interesting traffic" enters packet inspection engine 80 and is analyzed for keywords and other valuable bits of information, after which it is dropped. Original packets 210 traverse the router/switch in a normal fashion just as if the online ad engine does not exist.

FIG. 7 demonstrates a packet path for the downstream traffic, which may be modified for ad insertion purposes. In this case, upon entering router 30 via interface card 44A, traffic gets separated into "interesting" and non-interesting in filters 52 and follows different ways throughout the host system. Non-interesting traffic 204 traverses the router/switch in a normal fashion. Interesting traffic 202 enters packet inspection engine 80 and subsequently modification engine 82. Upon modification (ad insertion), the interesting traffic is returned into a normal datapath.

The operation of filters 52 is critical to building economically efficient online ad system. Filters 52 can use any packet matching criteria for selection of "interesting" traffic and any actions to aid the engines 80 and 82, as long as it can continue to operate at line rate without hampering any transit traffic. Filters 52 can also be modified at any time without packet loss associated with such a change.

Figure 8:
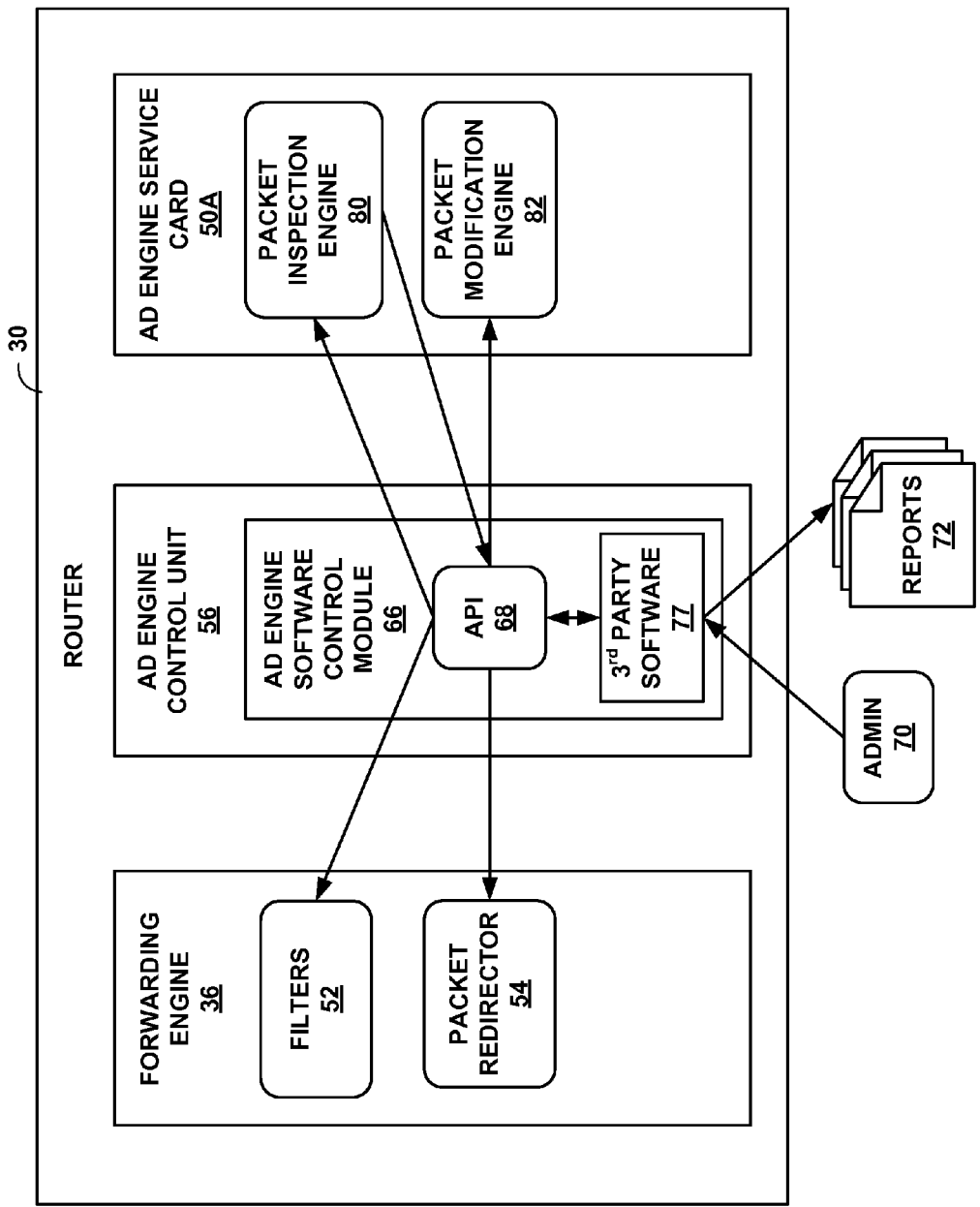
FIG. 8 demonstrates an example software architecture for the present invention.

FIG. 8 demonstrates an example software architecture for the present invention. As shown, the invention comprises an application-layer interface, API 68, that allows for control of filter 52, packet redirector 54, packet inspection engine 80, and packet modification engine 82. Ad engine software control module 66, which includes API 68, runs on the dedicated control board provided by ad engine control unit 56 and is independent from the router control software. The ad engine software accepts tasks from admin 70, which may be market research group personnel, and returns detailed reports and databases (illustrated as reports 72).

Figure 9:
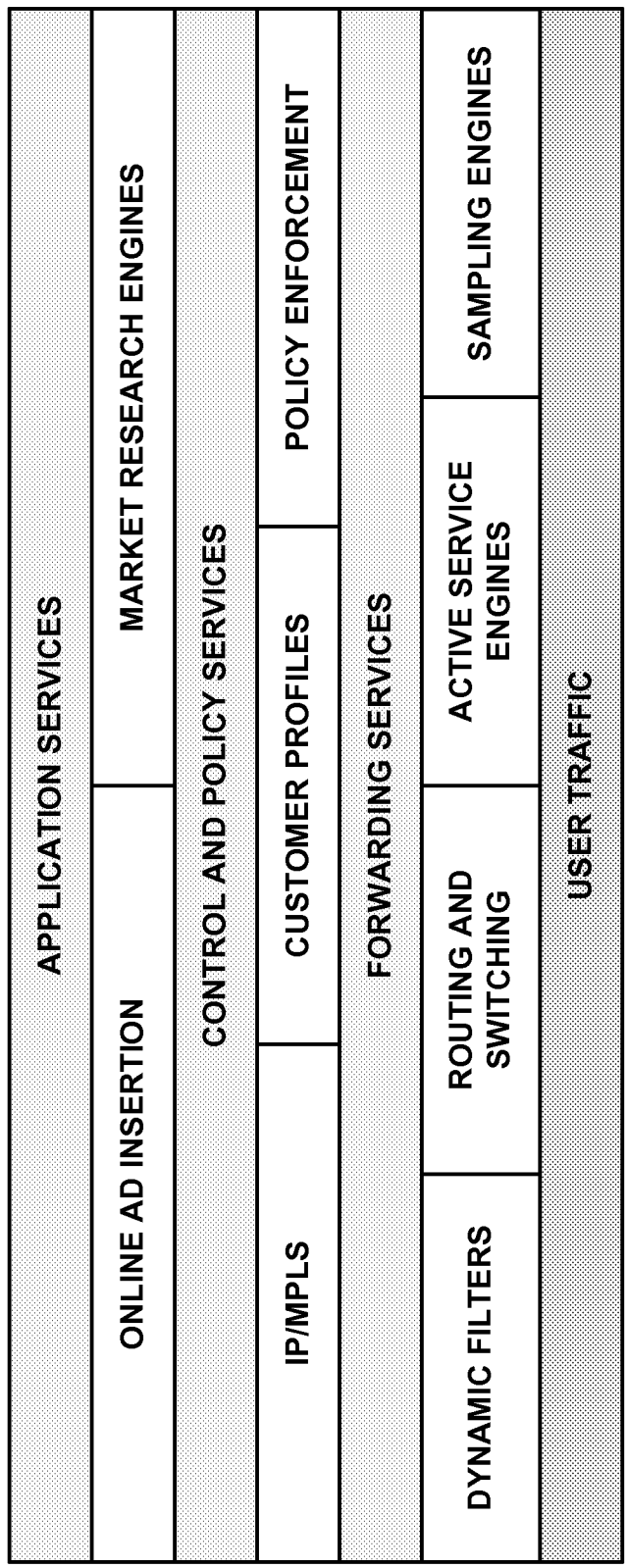
FIG. 9 is a block diagram illustrating example services provided at different layers within the router of FIG. 2.

FIG. 9 is a block diagram illustrating example services provided at different layers within router 30 of FIG. 2.

Figure 10:
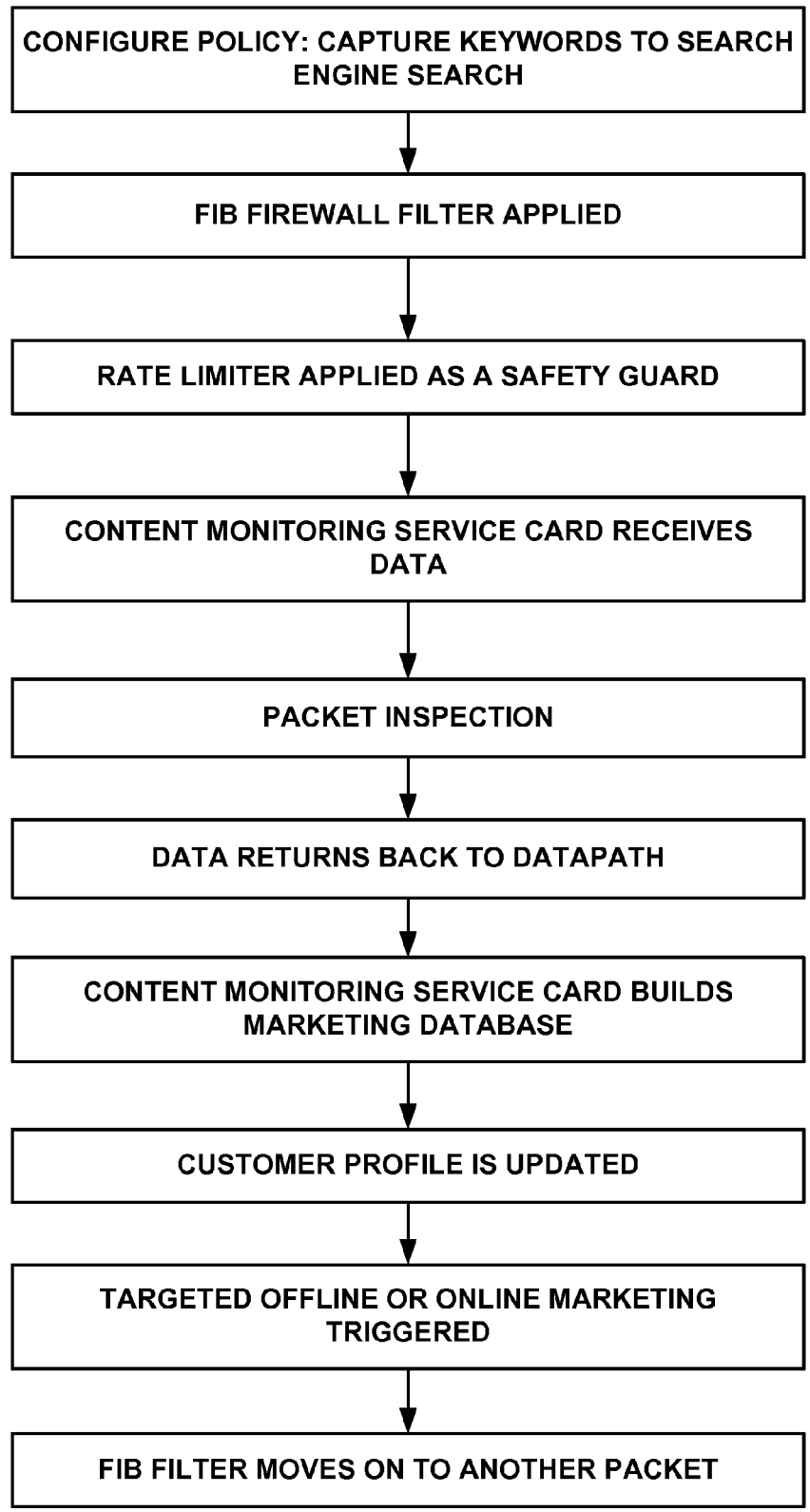
FIG. 10 is a flowchart illustrating example operation of the router of FIG. 2 in performing in-line packet inspection and modification for market research and influence consistent with the techniques of the invention.

FIG. 10 is a flowchart illustrating example operation of the router 30 of FIG. 2 in performing in-line packet inspection and modification for market research and influence consistent with the techniques of the invention.

EXAMPLES OF OPERATION

Assumptions: ISP "I" implements the described inline ad engine in a host system H. System H aggregates traffic from 10,000 customers of ISP A and connects them to the Internet.

Example 1

Company A runs online shopping business and wants to expand the customer base. They decide to attract minority customers and do research on how to do this. They found techniques X and Y. X is being used by competitor B and Y is being used by competitor C. Company A cannot invest into X and Y simultaneously; rather, they need to identify the best way to go after their target customer group. Market research is desired to identify popularity of shopping websites A, B and C within specific minority groups that comprise the clientele of ISP "I". The results are planned to be used for language-specific design improvements on website A.

Charter of Operation.

Filter 1 is programmed to identify the "interesting" traffic as such:
Destination IP addresses—blocks belonging to A, B, C.
Protocol—TCP, port 80 (www).
Actions=assign tag 1 to "interesting" traffic, move to redirector (2).
Redirector (2) is programmed with:
Action=replication, destination=inspection engine (3)
Inspection engine (3) is programmed with:
Search for: HTML "preferred language tags", log results every time unique source-destination IP address pair is found.

Online Ad software receives the results and constructs the breakdown of customer's language preferences to sites A, B, C. Customer A gets the report and finds specific minorities gravitating to certain features available from competition. Customer A decides to update their website to include features they found useful for competition. A few months after the website is updated, the same research is ordered again to check the results.

Example 2

Automotive company A introduced a new premium product X, which is quickly gaining market share. Automotive company B decides to offer exclusive savings on their product Y and use fashionable advertising to promote it to potential customers of company A. Promotion kit includes a valuable gift and costs $50 to manufacture; thus it cannot be offered at large scale. They also do not want to sacrifice the margins by offering exclusive savings on product Y to general public.

Charter of Operation.

Filter 1 is programmed to identify the "interesting" traffic as such:
Destination IP addresses—blocks belonging to company A
Protocol—TCP, port 80 (www)
Actions=assign tag 2 to "interesting" traffic, move to redirector (2)
Redirector (2) is programmed with:
Action=replication, destination=inspection engine (3)
Inspection engine (3) is programmed with:
Search for: HTML body, string match="build", "X"; the string matches their online configuration and pricing tool for model X. Every time a unique match is found, the results are recorded along with source IP address.

Online Ad software receives the results and matches source IP addresses with billing addresses for the ISP "I" customers. This list is offered to company B for targeted marketing purposes.

Example 3

Premium car dealership D operates in the vicinity of ISP "I" customer base. They decide to sponsor a closed-invitation list event to the active shoppers for premium brand cars and need a database for promoting the event. Blocks of IP addresses related to premium brands X, Y and Z are converted into list A. It is also determined that all three brands sell cars via financial service groups, which offer online account access to their customers.

Charter of Operation.

Filter 1 is programmed to identify the "interesting" traffic as such:
Destination IP addresses—blocks belonging to list A.
Protocol—TCP, port 80 (www)

Actions=assign tag 3 to "interesting" traffic, move to redirector (2)
Destination IP addresses—blocks belonging to list A
Protocol—TCP, port 443 (https)
Actions=assign tag 4 to "interesting" traffic, move to redirector (2)

Redirector (2) is programmed with:
Action=replication, destination=inspection engine (3)

Inspection engine (3) is programmed with:
Search for: tag 3, HTML body, string match="build"; the string matches typical online configuration and pricing tools used by X, Y and Z. Every time a unique match is found, the results are recorded along with source IP address.
Search for: tag 4. Every time a unique match is found, the results are recorded along with source IP address.

Online Ad software receives the results and compiles an intersection of two tables over the course of several months. Every source address that hit both tags 3 and 4 is assumed to belong to the current customer of X, Y or Z, who is financing a current car and started actively looking for replacement. This list is matched to the billing address for customers of ISP "I" and subsequently resold to dealership D Example 4. ISP "I" launches a new Internet access package at discount price. In return, customers are consent to seeing some amount of ad content in their web browsers. ISP "I" is concerned about profitability and effectiveness of this scheme. They decide to go with the lowest investment possible and introduce ad content in non-intrusive and non-annoying format. ISP "I" buys in-line ad engine and puts it into a router H. New data plan is gradually introduced to select customers served by router H.

Charter of Operation.
Filter 1 is programmed to identify the "interesting" traffic as such:
Destination IP addresses—list L of IP addresses belonging to new customers.
Protocol—TCP, port 80 (www)
Actions=Measure traffic rate hitting filter against a pre-configured limit L. Move traffic within a limit to redirector (2). Accept excess traffic (out of limit) for routing, record the event of excess traffic.

Redirector (2) is programmed with:
Action=forwarding, destination=inspection engine (3)

Inspection engine (3) is programmed with:
Search for: HTML body.

Modification engine (3) is programmed with:
Add a frame containing a small test ad to a new webpage identified within a TCP session. Recalculate higher-level protocol boundaries and checksums to match extra content. Continue relaying data until full HTTP response has been transmitted.

Since the amount of traffic flowing in the downstream direction is potentially large, Online Ad gauges traffic to identify the limit at which online ad engine will not be overloaded. It does so by sizing the list L. After serving the list L for some time, online ad software replaces all addresses in list L with random new addresses belonging to the customers on the same plan. This way, at any given point of time, ads are offered only to a small portion of the entire customer base. However, over a period of several days, each customer is covered with ad insertion activity.

Various embodiments of the invention have been described. These and other embodiments are within the scope of the following claims.

The invention claimed is:

1. A network router comprising:
a plurality of interfaces configured to send and receive packets;
a routing component that executes a routing protocol to maintain routing information specifying routes through a network;
a forwarding component configured by the routing component to apply forwarding information to select next hops for the packets and forward the packets to the interfaces in accordance with the routing information;
one or more advertising engine service cards comprising a packet inspection engine, a packet modification engine, and an advertising engine control unit;
wherein the forwarding component stores a set of dynamic filters that identify packets for inspection by the packet inspection engine based on characteristics of the packet,
wherein the forwarding component applies the set of dynamic filters to the received packets and directs any matching ones of the packets from the forwarding component to the packet inspection engine within the advertising engine service card,
wherein the packet inspection engine of the advertising engine service card analyzes the packets to extract information from the packets based on configured advertising engine policies; and
wherein, based on the inspection by the packet inspection engine, the packet modification engine modifies one or more of the packets by rewriting application-layer data contained within a payload of each of the packets to insert at least one advertisement within the application-layer data.

2. The network router of claim 1, wherein the packet modification engine modifies one or more of the packets in accordance with a policy based on the inspection by the packet inspection engine, wherein the policy is configured by a user via a user interface.

3. The network router of claim 1, wherein the packet inspection engine buffers the packets and reassembles an application layer communication based on a plurality of received packets in a packet flow session.

4. The network router of claim 3, wherein the packet modification engine modifies the application layer communication by inserting, modifying or removing one or more packets that make up the application layer communication so as to insert the at least one advertisement in the application layer communication.

5. The network router of claim 1, wherein applying the set of dynamic filters comprises:
for a first time period, applying a first set of dynamic filters that matches a first set of packets, and wherein the packet modification modifies the first set of packets by rewriting application-layer data contained within a payload of each of the first set of packets to insert at least one advertisement within the application-layer data;
modifying the set of dynamic filters to replace the first set of dynamic filters with a second set of dynamic filters that matches a second set of packets
for a second time period, applying the second set of dynamic filters, wherein the packet modification modifies the second set of packets by rewriting application-layer data contained within a payload of each of the second set of packets to insert at least one advertisement within the application-layer data.

6. The network router of claim 1, wherein the first set of dynamic filters matches a first set of source Internet Protocol (IP) addresses of customers, and wherein the second set of dynamic filters matches a second set of source Internet Protocol (IP) addresses of customers.

7. The network router of claim 1,
wherein the advertising engine control unit comprises a software application interface that is responsive to pluggable software installed on the advertising engine control unit, and
wherein the pluggable software presents a user interface that allows a user to configure the advertising engine policies and the dynamic filters applied by the forwarding component.

8. The network router of claim 7, wherein the pluggable software allows the user to request a report based on the information extracted from the received packets, and wherein the pluggable software generates the reports based on the request.

9. The network router of claim 7, wherein the pluggable software compiles a marketing database based on the information extracted from the received packets.

10. The network router of claim 1, wherein the packet inspection engine of the advertising engine service card performs market research analysis on the packets based on one of a keyword search of the packets, a fixed offset search of the packets, and an information correlation between fields of the packets.

11. The network router of claim 1, wherein the forwarding component comprises at least one stage of a switch fabric to forward the modified packets to the interfaces based on the selected next hops.

12. The network router of claim 1, wherein the routing component routes the modified packets in accordance with the routing protocol.

13. The network router of claim 1, wherein the dynamic filter matches packets based on information contained within a header of the received packet, and specifies an action to be performed on a matching packet.

14. The network router of claim 1, wherein at least one of the dynamic filters includes a rate-limiting filter term that directs the forwarding component to direct matching ones of the packets from the forwarding component to the packet inspection engine when a rate at which the matching ones of the packets is received is below a threshold, and directs the forwarding component to drop the matching ones of the packets when the rate exceeds the threshold.

15. The network router of claim 1, wherein at least one of the dynamic filters includes a filter that specifies a time period during which the filter is to be applied by the network router.

16. A method comprising:
receiving packets at a plurality of interfaces of a router;
maintaining routing information specifying routes through a network by executing a routing protocol at a routing component of the router;
selecting next hops for the packets within the network with a forwarding component configured by the routing component;
forwarding the packets to the interfaces in accordance with the routing information;
storing a set of dynamic filters with the forwarding component, wherein the dynamic filters identify packets for inspection by a packet inspection engine configured on an advertising engine service card of the router based on characteristics of the packets;
applying the set of dynamic filters to the received packets;
directing any matching ones of the packets from the forwarding component to the packet inspection engine within the advertising engine service card;
by the packet inspection engine of the advertising engine service card, analyzing the packets to extract information from the packets based on configured advertising engine policies; and
by a packet modification engine of the advertising engine service card, modifying one or more of the packets by rewriting application-layer data contained within a payload of each of the packets to insert at least one advertisement within the application-layer data.

17. The method of claim 16, wherein modifying comprises modifying the one or more of the packets in accordance with a policy based on the inspection by the packet inspection engine, wherein the policy is configured by a user via a user interface.

18. The method of claim 16, wherein applying the set of dynamic filters to the received packets comprises matching packets based on information contained within a header of the received packets, and specifying an action to be performed on the matching packets.

19. The method of claim 16, further comprising presenting a user interface with a pluggable software that allows a user to configure the advertising engine policies and the dynamic filters applied by the forwarding component.

20. The method of claim 16, further comprising forwarding the modified packets to the interfaces based on the selected next hops using at least one stage of a switch fabric.

21. The method of claim 16, further comprising compiling a marketing database based on the information extracted from the received packets.

22. The method of claim 16, wherein analyzing the packets comprises performing market research analysis on the packets for market research purposes based on one of a keyword search of the packets, a fixed offset search of the packets, and an information correlation between fields of the packets.

23. A method comprising:
receiving packets at a plurality of interfaces of a router;
maintaining routing information specifying routes through a network by executing a routing protocol at a routing component of the router;
selecting next hops for the packets within the network with a forwarding component configured by the routing component;
forwarding the packets to the interfaces in accordance with the routing information;
storing a set of dynamic filters with the forwarding component, wherein the dynamic filters identify packets for inspection by a packet inspection engine configured on an advertising engine service card of the router based on characteristics of the packets;
applying the set of dynamic filters to the received packets;
directing any matching ones of the packets from the forwarding component to the packet inspection engine within the advertising engine service card;
by the packet inspection engine of the advertising engine service card, analyzing the packets to extract information from the packets based on configured advertising engine policies; and
by the packet inspection engine of the advertising engine service card, compiling extracted information from the packets, wherein the information comprises a source Internet Protocol (IP) address of each of the packets;
by the advertising engine service card, matching the source IP address to billing address information of a customer associated with the source IP address.

24. The method of claim 23, further comprising providing at least a portion of the billing address information to a third party for targeted marketing activity.

25. A network switch comprising:
- a plurality of interfaces configured to send and receive packets;
- a forwarding plane that makes forwarding decisions to select next hops for the packets and forward the packets to the interfaces in accordance with the selected next hops;
- one or more advertising engine service cards comprising a packet inspection engine and an advertising engine control unit;
- wherein the forwarding plane stores a set of dynamic filters that identify packets for inspection by the packet inspection engine based on characteristics of the packet,
- wherein the forwarding plane applies the set of dynamic filters to the received packets and directs any matching ones of the packets from the forwarding plane to the packet inspection engine within the advertising engine service card,
- wherein the packet inspection engine of the advertising engine service cards analyzes the packets to extract information from the packets based on configured advertising engine policies, and
- wherein, based on the inspection by the packet inspection engine, the packet modification engine modifies one or more of the packets by rewriting application-layer data contained within a payload of each of the packets to insert at least one advertisement within the application-layer data.

26. A non-transitory computer-readable storage medium comprising instructions for causing a programmable processor to:
- receive packets at a plurality of interfaces of a router;
- maintain routing information specifying routes through a network by executing a routing protocol on a control unit of a routing component of the router;
- select next hops for the packets within the network with a forwarding component configured by the routing component;
- forward the packets to the interfaces in accordance with the routing information;

store a set of dynamic filters with the forwarding component, wherein the dynamic filters identify packets for inspection by a packet inspection engine configured on an advertising engine service card of the router based on characteristics of the packets;
- apply the set of dynamic filters to the received packets;
- direct any matching ones of the packets from the forwarding component to the packet inspection engine within the advertising engine service card;
- analyze the packets to extract information from the packets based on configured advertising engine policies; and
- modify one or more of the packets by rewriting application-layer data contained within a payload of each of the packets to insert at least one advertisement within the application-layer data.

* * * * *